United States Patent [19]
Teare et al.

[11] Patent Number: 5,243,652
[45] Date of Patent: Sep. 7, 1993

[54] LOCATION-SENSITIVE REMOTE DATABASE ACCESS CONTROL

[75] Inventors: Melvin J. Teare, Framingham; Stephen S. Walker, Marlborough, both of Mass.

[73] Assignee: GTE Laboratories Incorporated, Waltham, Mass.

[21] Appl. No.: 954,624

[22] Filed: Sep. 30, 1992

[51] Int. Cl.$^5$ .............................................. H04K 9/00
[52] U.S. Cl. ...................................... 380/21; 380/23; 380/25
[58] Field of Search ............................ 380/21, 23, 25

[56] References Cited

U.S. PATENT DOCUMENTS 4,860,352  8/1989  Laurance et al. ................. 380/23
4,993,067  2/1991  Leopold ............................ 380/21

Primary Examiner—Salvatore Cangialosi
Attorney, Agent, or Firm—Victor F. Lohmann, III

[57] ABSTRACT

A communication system includes a remote mobile node which acquires time-correlated data of its actual position from a global positional system (GPS), and securely transmits the information as a position history to a central facility. The mobile node includes encrypted programming material such as copyrighted video. At the central facility, a comparison is made between the received position history and predetermined signature data representing acceptable time-position histories. If a positive match is detected, a decryption key associated with the matched history is forwarded to the mobile node for decoding of the encrypted programming material.

5 Claims, 2 Drawing Sheets

5,243,652

LOCATION-SENSITIVE REMOTE DATABASE ACCESS CONTROL

FIELD OF THE INVENTION

This invention relates to video control systems and, more particularly, to a system for providing secure data communications with a mobile node.

BACKGROUND OF THE INVENTION

Secure data communication between a central database and a remote or mobile node typically rely upon secure data handling techniques such as encryption, but provide only limited control over the location of the remote node. In particular, the sheer mobility of a remote node makes it very difficult to protect against unauthorized use of equipment. For example, one scenario where protection is required is when an aircraft is on the ground or in hostile territory, where copying can be performed illegally or without authorization. Additionally, when individual passenger units are in use, a tape intended for authorized viewing could be stolen.

Some conventional systems for transmitting secure data messages provide some kind of control over hardware in a non-secure environment, where location affects the type of authorization granted mobile nodes. However, these systems are vulnerable because geographical information is not conveyed in a secure manner.

OBJECTS OF THE INVENTION

It is an object of the present invention to obviate the above-noted and other disadvantages of the prior art.

It is a further object of the present invention to provide location-sensitive control over remote or mobile systems in a secure manner, without requiring secure facilities for the remote or mobile node.

SUMMARY OF THE INVENTION

The present invention concerns a communication system comprising a remote mobile node including encrypted programming material, and a central facility. The central facility includes storage means for storing predetermined signature data each associated with a correspondingly respective code decryption key, wherein said signature data includes position and time information. The mobile node includes receiver means for acquiring actual position information on said mobile node and storing said acquired position information, and transmission means for communicating said position information to the central facility. The central facility further includes means for receiving and storing said position information as a location history, and means for comparing the location history to said predetermined signature data, and forwarding the corresponding key to said mobile node if the comparison satisfies a match condition.

DETAILED DESCRIPTION OF THE PREFERRED EMBODIMENTS

The present invention relates to a system which communicates authorization control signals from a central facility to a remote mobile node in response to a positive match between predetermined time-position signature data representing location histories and actual time-position data of the remote mobile node. The authorization permits, for example, the viewing of otherwise encrypted programming material. The authorization control signal is a code decryption key which is used at the remote node for decrypting the program. The system of the present invention is shown in the block diagram of FIG. 1.

A remote node 11 is a mobile unit where encrypted signals reside. In a preferred embodiment, the remote node is an aircraft, and the signals are video program material such as movies used as in-flight entertainment by the airline industry. The programming information is not limited to video material, as it should be obvious to those skilled in the art that data programming material may also be used. Additionally, the node 11 may include other mobile units, including terrestrial vehicles. The remote node 11 is equipped with a suitable receiver for acquiring its three-dimensional position information, namely latitude, longitude, and elevation, from a positioning system 10. One such suitable receiver is the Admiral GPS offered commercially from Micrologic, 9610 Desoto Avenue, Chatsworth, CA 91311.

The positioning system 10 may, for example, be Loran or GPS (Global Positioning System), a satellite navigation system. The GPS is presently available, and provides latitude, longitude, and altitude information on a worldwide basis through a standard digital interface, with updates every second. The position information is provided in these systems on a periodic basis, although the present invention is applicable to continuous information delivery systems.

The central facility 12 includes predetermined system information defining signature data for remote nodes which indicate acceptable location histories for when authorization may be granted to the node. For example, the central facility may only authorize viewing of the encrypted video signal on an airplane if the plane is over 25,000 ft. altitude and over a predesignated area. Thus, the signature data for the airplane includes position information correlated with time since the predetermined flight plan for a plane includes both position and time information. The authorization would be accomplished by transmission of a code decryption key from the central facility 12 to remote node 11, where the encrypted signal would be decoded with the key.

Figure 1:
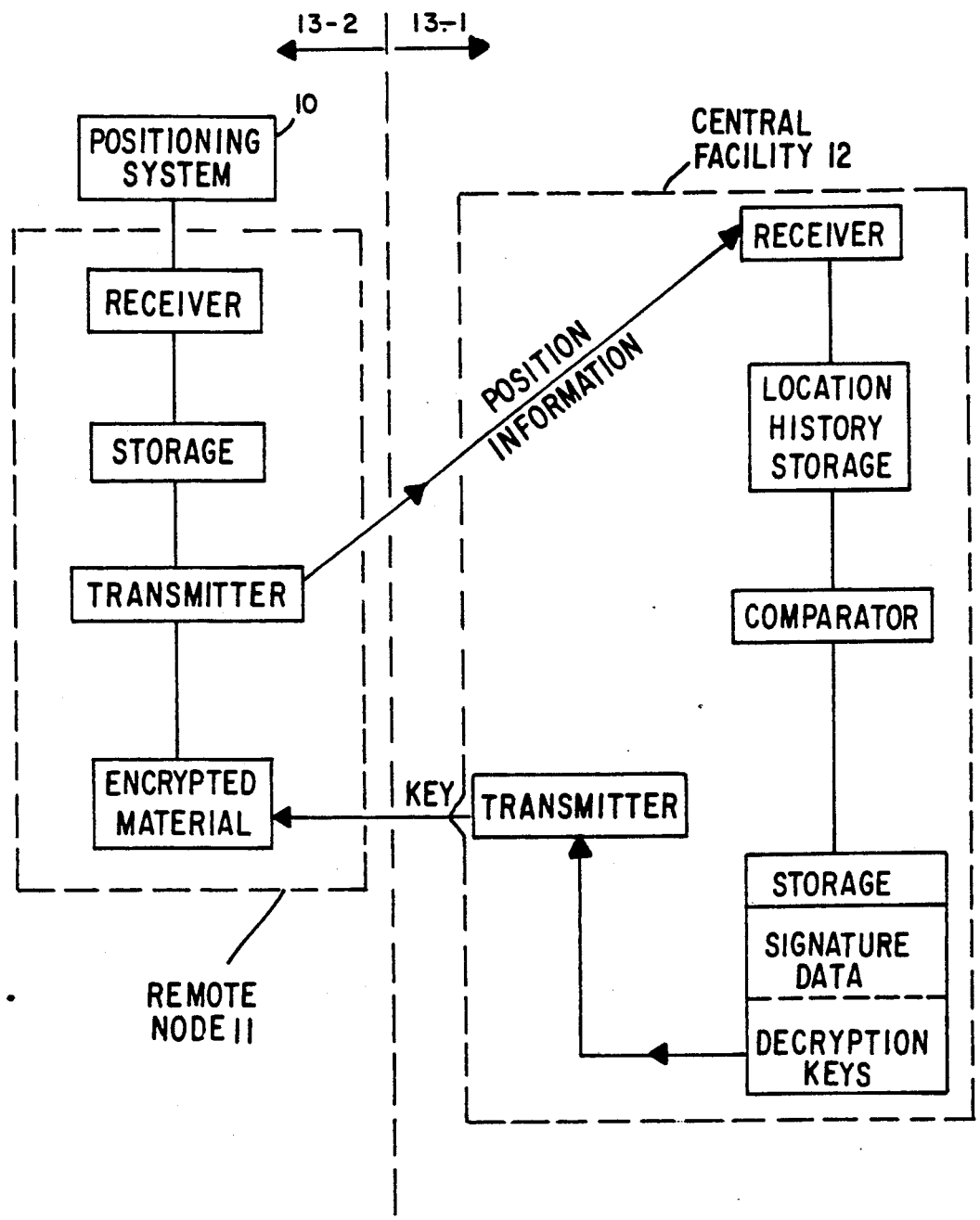
FIG. 1 is a block diagram of a system according to the present invention.
Figure 2:
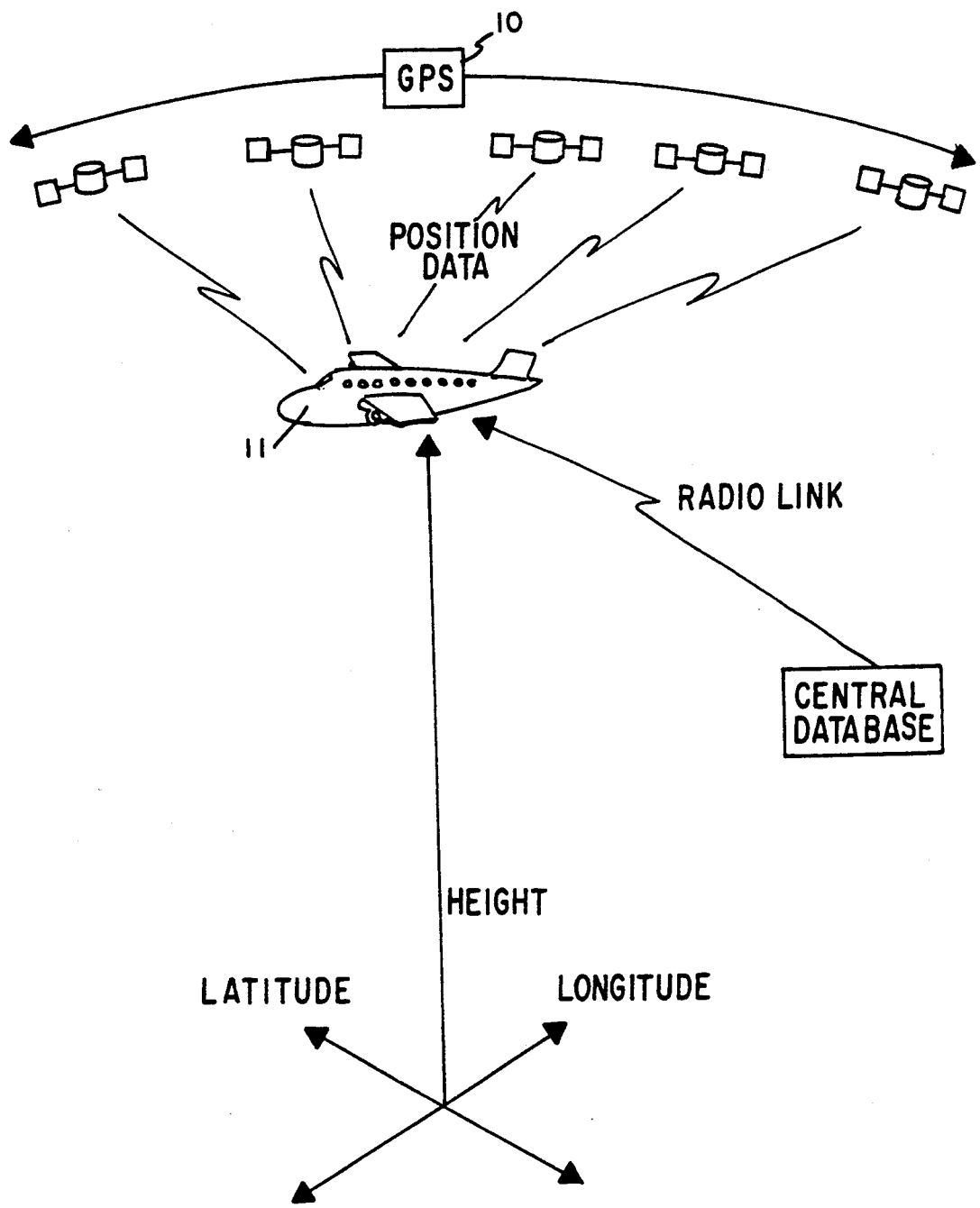
FIG. 2 is a diagram of a communication scenario depicting an implementation of the present invention.

Although in FIG. 1 there is indicated a single central facility 12, there may be a plurality of such facilities interconnected by appropriate networks. These facilities would reside in a region 13-1 representing fixed sites. Furthermore, block 11 may include a plurality of remote mobile nodes, with region 13-2 representing the mobile section of the communication system, namely the remote mobile nodes and the position-sensing system 10. It should be obvious to those skilled in the art that the present invention is easily adaptable to include a plurality of mobile nodes with suitable reception, signal processing, and transmission equipment at the central facility 12. The specific mechanism for granting authorization is detailed below.

The remote node 11 is configured with a means for storing the position information which is acquired from positioning system 10. Preferably, the storage means includes a secure non-volatile memory, and is managed with suitable software which can process the received position information and organize it into a suitable format with timing data for further transmission to the central facility 12.

The position information being stored in the remote node 11 defines a geographical tracking of node 11. When this tracking data is correlated with timing data, namely the time at which node 11 was at a particular position, there is provided a unique location history of node 11. This location history is transmitted to central facility 12. Preferably, the transmission is performed in a secure manner with appropriate equipment so as to defeat interception. The transmission may be accomplished by means well known to those skilled in the art, including transmission via a direct radio link, and may represent either continuous or periodic (most likely) data on the actual position of the mobile node depending upon the sophistication of the position sensing and information acquisition equipment.

The central facility 12 is adaptably configured to receive and store the location history being transmitted from node 11. The facility 12 includes a database having a plurality of location histories (i.e. signature data) stored therein which correspond to acceptable time-position information for node 11. Each location history is associated with a respective unique code decryption key which will decode the encrypted signal at node 11 only if the location history received from node 11 matches the predetermined location history associated with the key.

Accordingly, facility 12 includes a means for comparing the received location history from node 11 to the predetermined location histories in the database. If a match condition is satisfied, then authorization is granted, and the key associated with the matched predetermined history is released for transmission to node 11. The node 11 is suitably equipped with a signal processing system for decoding the encrypted signal using the received code decryption key. Examples of video control systems are found in U.S. Pat. Nos. 5,046,090 and 5,046,092, incorporated herein by reference. If a match condition is not satisfied, then viewing authority is not granted, which may imply that unauthorized access to the encrypted signal is being attempted at node 11. The facility 12 may, for example, be responsive to a request signal from node 11 to commence comparison of the received and predetermined location histories.

The position history from the GPS represents a sequence of distinct time-position values (i.e. latitude, longitude, elevation) corresponding to the instantaneous position of the mobile node over a period of time. Consequently, the history is a sequence of time-position data which tracks the route of the mobile node. The security supervisor managing the system will determine the match condition for allowing release of a decryption key. In particular, the supervisor will determine the number of actual time-position values in sequence which must match a like sequence of the predetermined signature data for a match to occur. For example, in a highly secure system, an approved route may have a lengthy series of time-position values which must be matched for a node to be considered valid.

This invention makes use of readily available technology to provide additional controls on secure data communications. The remote or mobile system node is coupled to a position sensing receiver such as GPS or Loran, allowing position tracking in a secure manner. This allows information to be sent only to a requesting destination that is in a geographical position acceptable to the sender. One specific application is for delivery of the keys for video tape descrambling on-board aircraft, where the keys are to be released only when the aircraft is in appropriate airspace. This would be used to reduce the risk of the information guarded by the keys (the copyrighted movie in this case) from being illegally copied and distributed when the aircraft is on the ground, especially at overseas destinations.

The invention takes advantage of small position errors associated with each GPS, namely time and position. This assures a unique position indication from two systems (mobile node and central facility) with identical location histories, thereby making it very difficult for a potential pirate to emulate previous geographical position data. The central facility is equipped with a database that is configured to analyze present and previous position data with predetermined system constraints to determine if viewing authority is granted, which means that the hardware impact on the remote or mobile nodes is minimal.

While there has been shown and described what are at present considered the preferred embodiments of the invention, it will be obvious to those skilled in the art that various changes and modifications can be made therein without departing from the scope of the invention as defined by the appended claims.

We claim:

1. A communication system, comprising:
   a remote mobile node including encrypted programming material;
   a central facility;
   storage means at said central facility for storing predetermined signature data each associated with a correspondingly respective code decryption key, wherein said signature data includes position and time information;
   receiver means at said mobile node for acquiring actual position information on said mobile node and storing said acquired position information;
   transmission means at said mobile node for communicating said position information to said central facility;
   means at said central facility for receiving and storing said position information as a location history; and
   means at said central facility for comparing the location history to said predetermined signature data, and forwarding the corresponding key to said mobile node if the comparison satisfies a match condition.

2. The system as recited in claim 1 wherein:
   said storage means at said central facility includes a database.

3. The system as recited in claim 1 wherein said programming material includes:
   video or data information.

4. The system as recited in claim 1 wherein:
   said receiver means acquires actual position information on a periodic basis.

5. A method of providing secure data communications from a central facility to a mobile node, comprising the steps of:
   acquiring and storing at said mobile node signature data defining a position history of said mobile node which is correlated with time;
   transmitting said signature data to a central facility having predetermined time-position history sequences each associated with respective code decryption keys;

comparing said signature data to the predetermined history sequences at said central facility for detecting the occurrence of a match condition;

if a match condition is detected, transmitting from the central facility to the mobile node the respective code decryption key corresponding to the particular predetermined history sequence causing the occurrence of said match condition.

* * * * *